US006631452B1

(12) United States Patent
Lin

(10) Patent No.: US 6,631,452 B1
(45) Date of Patent: Oct. 7, 2003

(54) REGISTER STACK ENGINE HAVING SPECULATIVE LOAD/STORE MODES

(75) Inventor: Derrick Lin, San Mateo, CA (US)

(73) Assignee: Idea Corporation, Santa Clara, CA (US)

( * ) Notice: Subject to any disclaimer, the term of this patent is extended or adjusted under 35 U.S.C. 154(b) by 0 days.

(21) Appl. No.: 09/561,145

(22) Filed: Apr. 28, 2000

(51) Int. Cl.[7] ............................................. G06F 13/00
(52) U.S. Cl. ...................................... 711/159; 711/154
(58) Field of Search .............................. 711/100, 154, 711/118, 159, 214; 712/28, 228, 12

(56) References Cited

U.S. PATENT DOCUMENTS

| | | | | |
|---|---|---|---|---|
| 5,142,635 A | * | 8/1992 | Saini ........................... | 712/225 |
| 5,420,991 A | * | 5/1995 | Konigsfeld et al. .......... | 711/150 |
| 5,463,745 A | * | 10/1995 | Vidwans et al. ............. | 712/218 |
| 5,479,633 A | * | 12/1995 | Wells et al. .................. | 711/103 |
| 5,522,051 A | * | 5/1996 | Sharangpani ................ | 712/202 |
| 5,535,397 A | * | 7/1996 | Durante et al. .............. | 710/267 |
| 5,574,935 A | * | 11/1996 | Vidwans et al. ............. | 712/23 |
| 5,640,582 A | * | 6/1997 | Hays et al. ................... | 712/38 |
| 5,680,640 A | * | 10/1997 | Ofek et al. ................... | 710/19 |
| 5,751,996 A | * | 5/1998 | Glew et al. .................. | 711/145 |
| 5,778,245 A | * | 7/1998 | Papworth et al. ............ | 712/23 |
| 5,852,726 A | * | 12/1998 | Lin et al. ..................... | 712/200 |
| 5,867,602 A | * | 2/1999 | Zandi et al. ................. | 382/248 |
| 5,974,525 A | * | 10/1999 | Lin et al. ..................... | 712/23 |
| 6,006,318 A | * | 12/1999 | Hansen et al. ............... | 712/28 |
| 6,035,389 A | * | 3/2000 | Grochowski et al. ........ | 712/216 |
| 6,065,114 A | * | 5/2000 | Zahir et al. .................. | 712/228 |
| 6,202,204 B1 | * | 3/2001 | Wu et al. ..................... | 717/151 |
| 6,219,783 B1 | * | 4/2001 | Zahir et al. .................. | 712/228 |
| 6,243,668 B1 | * | 6/2001 | Le et al. ....................... | 703/27 |
| 6,314,513 B1 | * | 11/2001 | Ross et al. ................... | 712/228 |
| 6,321,328 B1 | * | 11/2001 | Karp et al. ................... | 712/225 |
| 6,367,005 B1 | * | 4/2002 | Zahir et al. .................. | 712/228 |
| 6,453,388 B1 | * | 9/2002 | Gonzales et al. ............ | 711/137 |
| 6,487,630 B2 | * | 11/2002 | Bui .............................. | 711/109 |
| 2002/0056024 A1 | * | 5/2002 | Bui .............................. | 711/118 |

* cited by examiner

*Primary Examiner*—Tuan V. Thai
(74) *Attorney, Agent, or Firm*—Blakely, Sokoloff, Taylor & Zafman LLP

(57) ABSTRACT

A computer system is provided having a register stack engine to manage data transfers between a backing store and a register stack. The computer system includes a processor and a memory coupled to the processor through a memory channel. The processor includes a register stack to store data from one or more procedures in one or more frames, respectively. The register stack engine monitors activity on the memory channel and transfers data between selected frames of the register stack and a backing store in the memory responsive to the available bandwidth on the memory channel.

22 Claims, 6 Drawing Sheets

REGISTER STACK ENGINE HAVING SPECULATIVE LOAD/STORE MODES

BACKGROUND OF THE INVENTION

1. Technical Field

The present invention relates to microprocessors and, in particular, to mechanisms for managing data in a register file.

2. Background Art

Modern processors include extensive execution resources to support concurrent processing of multiple instructions. A processor typically includes one or more integer, floating point, branch, and memory execution units to implement integer, floating point, branch, and load/store instructions, respectively. In addition, integer and floating point units typically include register files to maintain data relatively close to the processor core.

A register file is a high speed storage structure that is used to temporarily store information close to the execution resources of the processor. The operands on which instructions operate are preferentially stored in the entries ("registers") of the register file, since they can be accessed more quickly from these locations. Data stored in larger, more remote storage structures such as caches or main memory, may take longer to access. The longer access times can reduce the processor's performance. Register files thus serve as a primary source of data for the processor's execution resources, and high performance processors provide large register files to take advantage of their low access latency.

Register files take up relatively large areas on the processor's die. While improvements in semiconductor processing have reduced the size of the individual storage elements in a register, the wires that move data in and out of these storage elements have not benefited to the same degree. These wires are responsible for a significant portion of the register file's die area, particularly in the case of multi-ported register files. The die area impact of register files limits the size of the register files (and the number of registers) that can be used effectively on a given processor. Although the number of registers employed on succeeding processor generations has increased, so has the amount of data processors handle. For example, superscalar processors include multiple instruction execution pipelines, each of which must be provided with data. In addition, these instruction execution pipelines operate at ever greater speeds. The net result is that the register files remain a relatively scare resource, and processors must manage the movement of data in and out of these register files carefully to operate at their peak efficiencies.

Typical register management techniques empty registers to and load registers from higher latency storage devices, respectively, to optimize register usage. The data transfers are often triggered when control of the processor passes from one software procedure to another. For example, data from the registers used by a first procedure that is currently inactive may be emptied or "spilled" to a backing store if an active procedure requires more registers than are currently available in the register file. When control is returned to the first procedure, registers are reallocated to the procedure and loaded or "filled" with the associated data from the backing store.

The store and load operations that transfer data between the register file and backing store may have relatively long latencies. This is particularly true if the data sought is only available in one of the large caches or main memory or if significant amounts of data must be transferred from anywhere in the memory hierarchy. In these cases, execution of the newly activated procedure is stalled while the data transfers are implemented. Execution stalls halt the progress of instructions through the processor's execution pipeline, degrading the processor's performance.

The present invention addresses these and other problems related to register file management.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a mechanism for managing the storage of data in a processor's register files. The mechanism identifies available execution cycles in a processor and uses the available execution cycles to speculatively spill data from and fill data into the registers of a register file. Registers associated with currently inactive procedures are targeted by the speculative spill and fill operations.

For one embodiment of the invention, the speculative spill and fill operations increase the "clean partition" of the register file, using available bandwidth in the processor-memory channel. Here, "clean partition" refers to registers that store valid data which is also backed up in the memory hierarchy, e.g. a backing store. These registers may be allocated to a new procedure without first spilling them because the data they store has already been backed up. If the registers are not needed for a new procedure, they are available for the procedure to which they were previously allocated without first filling them from the backing store. Speculative spill and fill operations reduce the need for mandatory spill and fill operations, which are triggered in response to procedures calls, returns, returns from interrupts, and the like. Mandatory spill and fill operations may cause the processor to stall if the active procedure can not make forward progress until the mandatory spill/fill operations complete.

One embodiment of a computer system in accordance with the present invention includes a processor and a memory coupled to the processor through a memory channel. The processor includes a stacked register file and a register stack engine. The stacked register file stores data for one or more procedures in one or more frames, respectively. The register stack engine monitors activity on the processor-memory channel and transfers data between selected frames of the register file and a backing store responsive to the available bandwidth in the memory channel. For example, the register stack engine may monitor a load/store unit of the processor for empty instruction slots and inject speculative load/store operations for the register file when available instruction slots are identified.

Figure 1:
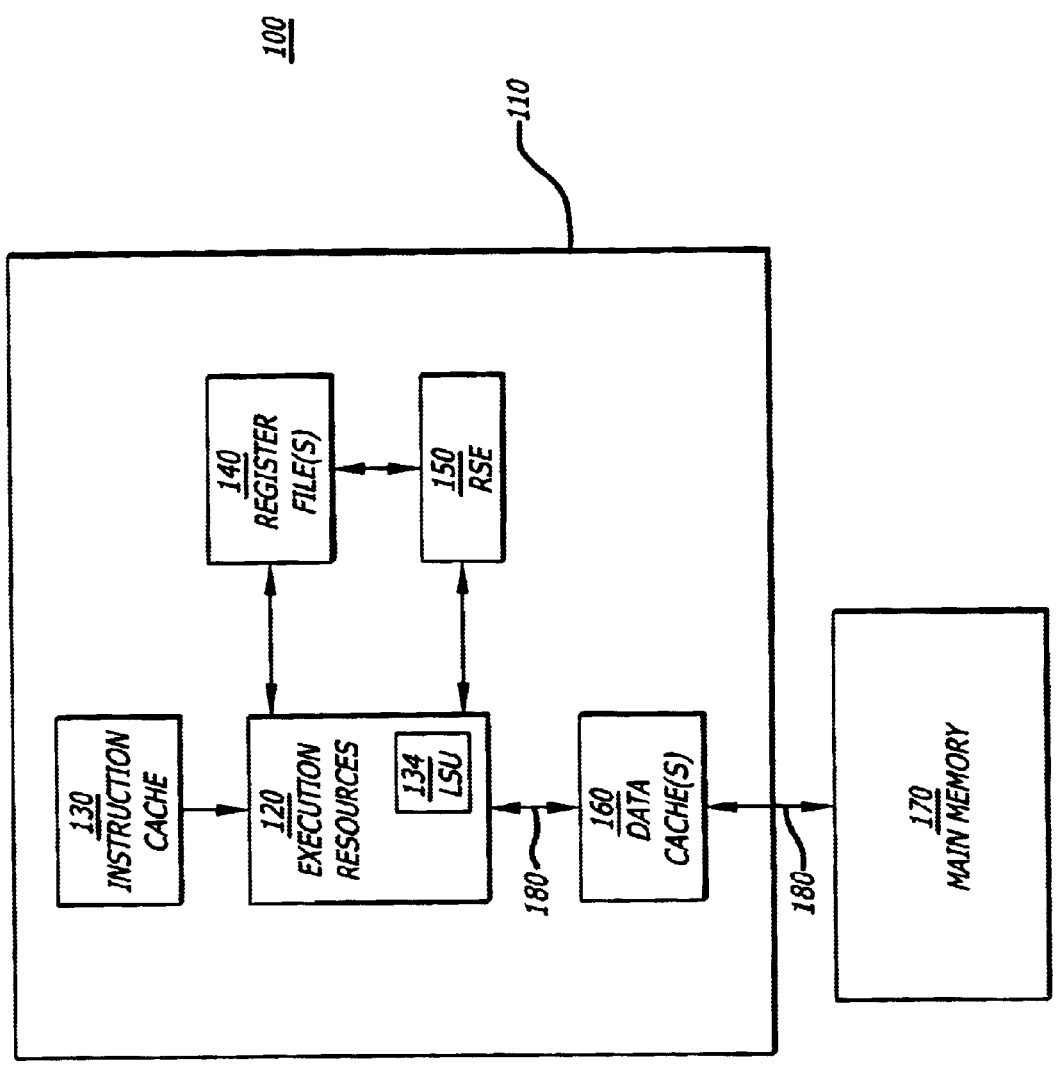
FIG. 1 is a block diagram of one embodiment of a computer system that implements the present invention.

FIG. 1 is a block diagram of one embodiment of a computer system 100 in accordance with the present invention. Computer system 100 includes a processor 110 and a main memory 170. Processor 110 includes an instruction cache 120, an execution core 130, one or more register files 140, a register stack engine (RSE) 150, and one or more data caches 160. A load/store execution unit (LSU) 134 is shown in execution core 130. Other components of processor 110 such as rename logic, retirement logic, instruction decoders, arithmetic/logic unit(s) and the like are not shown. A bus 180 provides a communication channel between main memory 170 and the various components of processor 110.

For the disclosed embodiment of computer system 100, cache(s) 160 and main memory 190 form a memory hierarchy. Data that is not available in register file 140 may be provided by the first structure in the memory hierarchy in which the data is found. In addition, data that is evicted from register file 140 to accommodate new procedures may be stored in the memory hierarchy until it is needed again. RSE 150 monitors traffic on the memory channel and initiates data transfers between register file(s) 140 and the memory hierarchy when bandwidth is available. For example, RSE 150 may use otherwise idle cycles, i.e. empty instruction slots, on LSU 134 to speculatively execute spill and fill operations. The speculative operations are targeted to increase the portion of data in register file 140 that is backed up in memory 190.

For one embodiment of the invention, register file 140 is logically partitioned to store data associated with different procedures in different frames. Portions of these frames may overlap to facilitate data transfers between different procedures. To increase the number of registers available for use by the currently executing procedure, RSE 150 speculatively transfers data for inactive procedures between register file 140 and the memory hierarchy. For example, RSE 150 may store data from registers associated with inactive procedures (RSE_Store) to a backing memory. Here, an inactive or parent procedure is a procedure that called the current active procedure either directly or through one or more intervening procedures. Speculative RSE_Stores increase the probability that copies of data stored in registers is already backed up in the memory hierarchy should the registers be needed for use by an active procedure. Similarly, RSE 150 may load data from the memory hierarchy to registers that do not currently store valid data (RSE_Load). Speculative RSE_Loads increase the probability that the data associated with an inactive (parent) procedure will be available in register file 140 when the procedure is re-activated.

Figure 2:
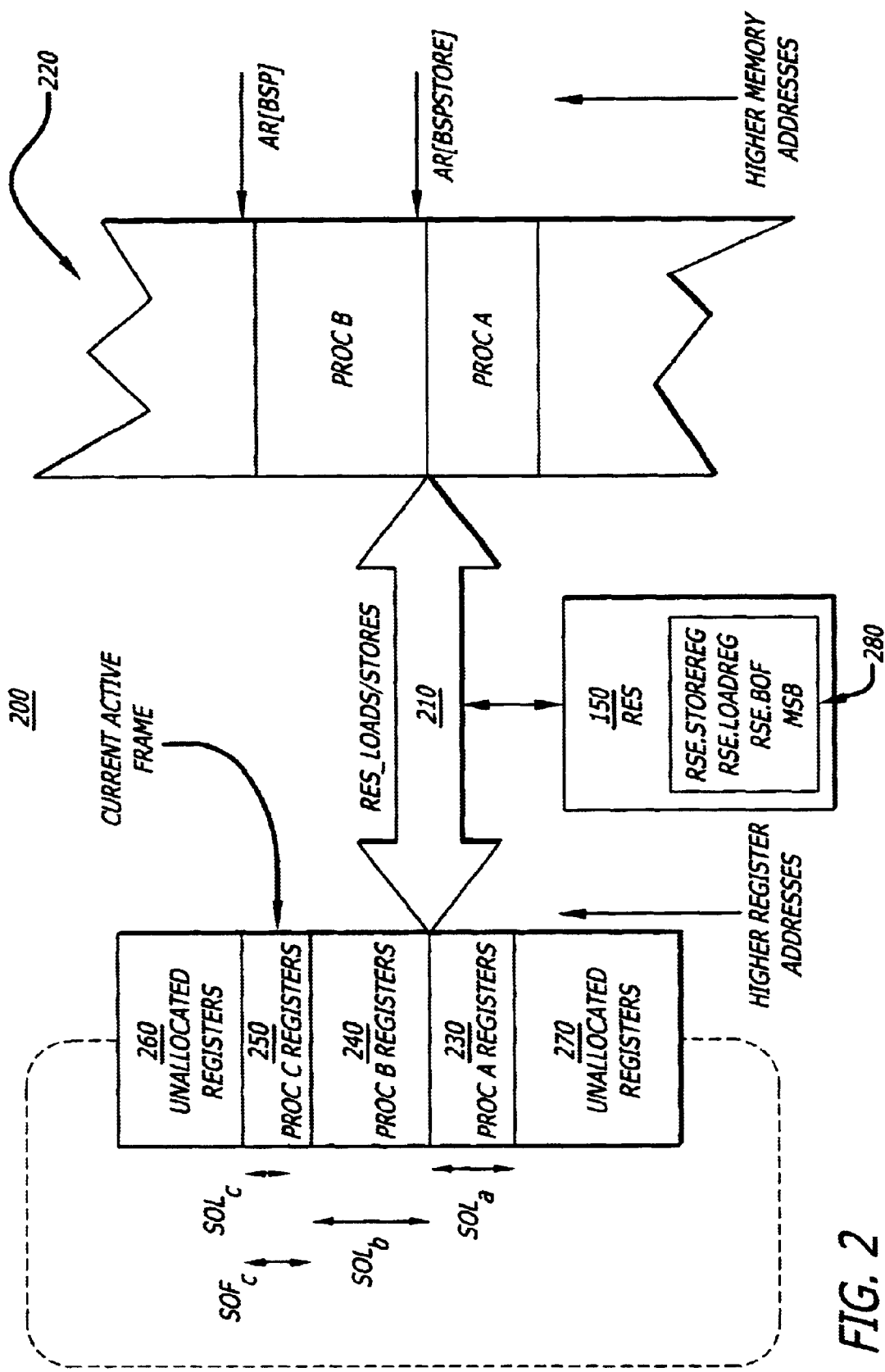
FIG. 2 is a block diagram representing one embodiment of a register management system in accordance with the present invention.

FIG. 2 is a schematic representation of a register management system 200 that is suitable for use with the present invention. Register management system 200 includes register file 140, RSE 150, a memory channel 210 and a backing store 220. Backing store 220 may include, for example, memory locations in one or more of cache(s) 160 and main memory 170. Memory channel 210 may include, for example, bus 180 and/or LSU 134.

RSE 150 manages data transfers between stacked register file 140 and backing store 220. The disclosed embodiment of RSE 150 includes state registers 280 to track the status of the speculative and mandatory operations it implements. State registers 280 may indicate the next registers targeted by speculative load and store operations ("RSE.LoadReg" and "RSE.StoreReg", respectively), as well as the location in the backing store associated with the currently active procedure ("RSE.BOF"). Also shown in FIG. 2 is an optional mode status bit ("MSB") that indicates which, if any, of the speculative operations RSE 150 should implement. These features of RSE 150 are discussed below in greater detail.

The disclosed embodiment of register file 140 is a stacked register file that is operated as a circular buffer (dashed line) to store data for current and recently active procedures. The embodiment is illustrated for the case in which data for three procedures, ProcA, ProcB and ProcC, is currently being stored. The figure represents the state of register file 140 after ProcA has called ProcB, which has in turn called ProcC. Each process has been allocated a set of registers in stacked register file 140.

In the exemplary state, the instructions of ProcC are currently being executed by processor 110. That is, ProcC is active. The current active frame of stacked register file 140 includes registers 250, which are allocated to ProcC. ProcB, which called ProcC, is inactive, and ProcA, which called ProcB, is inactive. ProcB and ProcA are parent procedures. For the disclosed embodiment of register management system 200, data is transferred between execution core 130 and registers 250 (the active frame) responsive to the instructions of ProcC. RSE 150 implements speculative spill and fill operations on registers 230 and.240, which are allocated to inactive procedures, ProcA and ProcB, respecitvely. Unallocated registers 260, 270 appear above and below allocated registers 230, 240, 250 in register file 140

For the disclosed embodiment of register file 140, the size of the current active frame (registers 250) is indicated by a size of frame parameter for ProcC (SOF$_c$). The active frame includes registers that are available only to ProcC (local registers) as well as registers that may be used to share data with other procedures (output registers). The local registers for ProcC are indicated by a size of locals parameter (SOL$_c$). For inactive procedures, ProcA and ProcB, only local registers are reflected in register file 140 (by SOL$_a$ and SOL$_b$, respectively). The actual size of the corresponding frames, when active, are indicated through frame-tracking registers, which are discussed in greater detail below.

Figure 3:
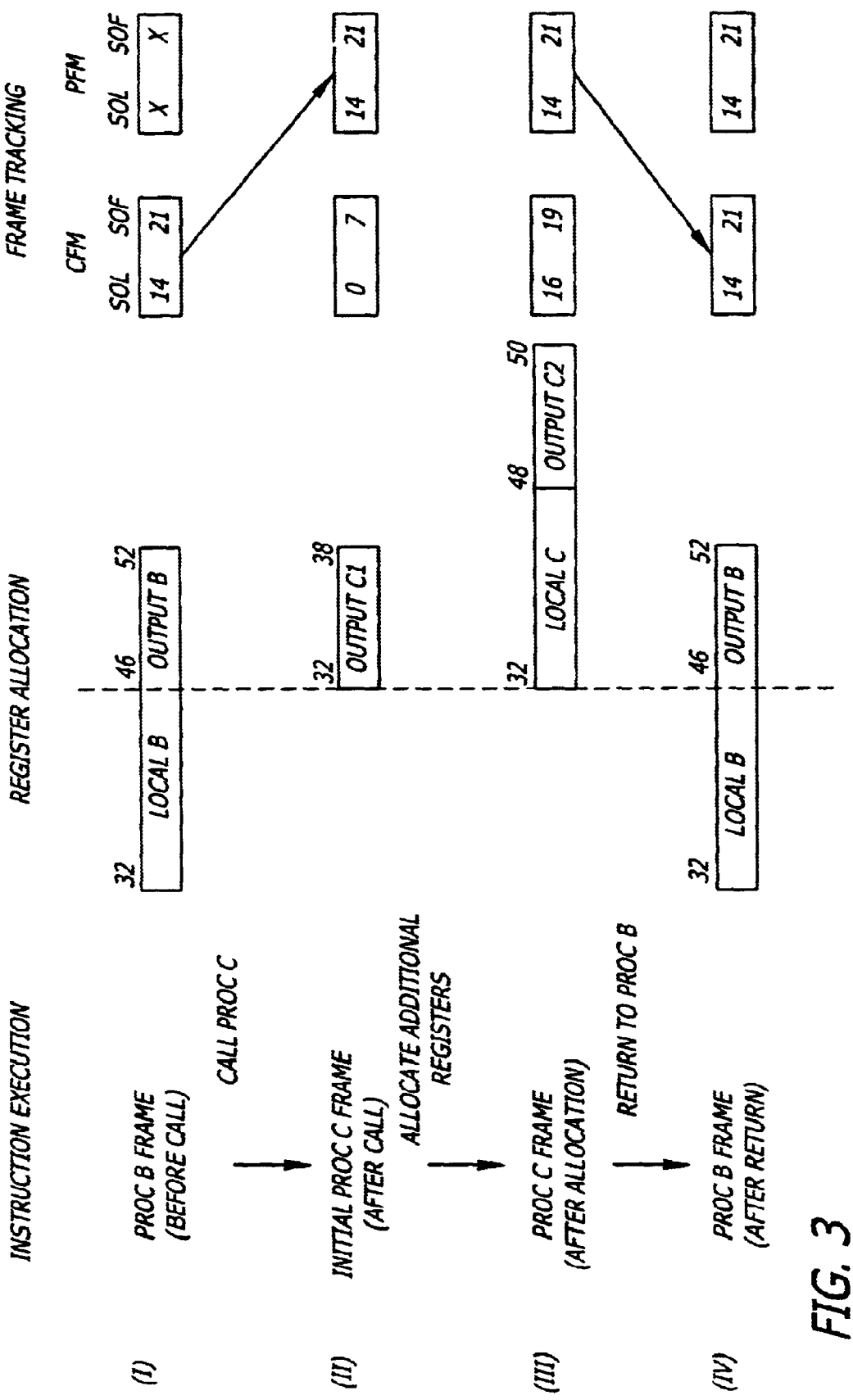
FIG. 3 is a schematic representation of register allocation operations for one embodiment of the register file of FIG. 1.

FIG. 3 represents a series of register allocation/deallocation operations in response to procedure calls and returns for one embodiment of computer system 100. In particular, FIG. 3 illustrates the instructions, register allocation, and frame tracking that occur when ProcB passes control of processor 110 to ProcC and when ProcC returns control of processor 110 to ProcB.

At time (I), the instructions of ProcB are executing on the processor, i.e. ProcB is active. ProcB has a frame size of 21 registers (SOF$_b$=21), of which 14 are local to ProcB (SOL$_b$= 14) and 7 are available for sharing. A current frame marker (CFM) tracks SOF and SOL for the active procedure, and a previous frame marker (PFM) tracks SOF and SOL for the procedure that called the current active procedure.

ProcB calls ProcC, which is initialized with the output registers of ProcB and no local registers ($SOL_c=0$ and $SOF_c=7$) at time (II). For the disclosed embodiment, initialization is accomplished by renaming output registers of ProcB to output registers of ProcC. The SOF and SOL values for ProcB are stored in PFM and the SOF and SOL values of ProcC are stored in CFM.

ProcC executes an allocate instruction to acquire additional registers and redistribute the registers of its frame among local and output registers. At time (III), following the allocation, the current active frame for ProcC includes 19 registers, 16 of which are local. CFM is updated from ($SOL_c=0$ and $SOF_c=7$) to ($SOL_c=16$ and $SOF_c=19$). PFM is unchanged by the allocation instruction. When ProcC completes, it executes a return instruction to return control of the processor to ProcB. At time (IV), following execution of the return instruction, ProcB's frame is restored using the values from PFM.

The above described procedure-switching may trigger the transfer of data between register file 140 and backing store 220. Load and store operations triggered in response to procedure switching are termed "mandatory". Mandatory store ("spill") operations occur, for example, when a new procedure requires the use of a large number of registers, and some of these registers store data for another procedure that has yet to be copied to backing store 210. In this case, RSE 150 issues one or more store operations to save the data to backing store 210 before allocating the registers to the newly activated procedure. This prevents the new procedure from overwriting data in the newly allocated registers.

Mandatory fill operations may occur when the processor returns to a parent procedure if the data associated with the parent procedure has been evicted from the register file to accommodate data for another procedure. In this case, RSE 150 issues one or more load operations to restore the data to the registers associated with the re-activated parent procedure.

When forward progress of the newly activated (or re-activated) procedure is blocked by mandatory spill and fill operations, the processor stalls until these operations complete. This reduces the performance of the processor.

The present invention provides a mechanism that speculatively saves and restores (spills and fills) data from registers in inactive frames to reduce the number of stalls generated by mandatory RSE operations. Speculative operations allow the active procedure to use more of the registers in register file 140 without concern for overwriting data from inactive procedures that has yet to be backed-up or evicting data for inactive procedures unnecessarily.

For one embodiment of the invention, the register file is partitioned according to the state of the data in different registers. These registers are partitioned as follows:

The Clean Partition includes registers that store data values from parent procedure frames. The registers in this partition have been successfully spilled to the backing store by the RSE and their contents have not been modified since they were written to the backing store. For the disclosed embodiment of the register management system, the clean partition includes the registers between the next register to be stored by the RSE (RSE.StoreReg) and the next register to be loaded by the RSE (RSE.LoadReg).

The Dirty Partition includes registers that store data values from parent procedure frames. The data in this partition has not yet been spilled to the backing store by the RSE. The number of registers in the dirty partition ("ndirty") is equal to the distance between a pointer to the register at the bottom of the current active frame (RSE.BOF) and a pointer the next register to be stored by the RSE (RSE.StoreReg).

The Current Frame includes stacked registers allocated for use by the procedure that currently controls the processor. The position of the current frame in the physical stacked register file is defined by RSE.BOF, and the number of registers in the current frame is specified by the size of frame parameter in the current frame marker (CFM.sof).

The Invalid Partition includes registers outside the current frame that do not store values from parent procedures. Registers in this partition are available for immediate allocation into the current frame or for RSE load operations.

For one embodiment of the invention, RSE 150 tracks the register file partitions and initiates speculative load and store operations between the register file and the backing store when the processor has available bandwidth. Table 1 summarizes the parameters used to track the partitions and the internal state of the RSE. The parameters are named and defined in the first two columns, respectively, and the parameters that are architecturally visible, e.g. available to software, are indicated in the third column of the table. Here, AR represents a set of application registers that may be read or modified by software operating on, e.g., computers system 100. The exemplary registers and instructions discussed in conjunction with Tables 1–4 are from the IA64™ Instruction Set Architecture (ISA), which is described in Intel® IA64 Architecture Software Developer's Guide, Volumes 1–4, published by Intel® Corporation of Santa Clara, Calif.

TABLE 1

| Name | Description | Architectural Location |
| --- | --- | --- |
| RSE.N_Stacked_Phys | Number of stacked physical registers in the particular implementation of the register file | |
| RSE.BOF | Number of the physical register at the bottom of the current frame. For the disclosed embodiment, this physical register is mapped to logical register 32. | AR[BSP] |
| RSE.StoreReg | Physical register number of the next register to be stored by the RSE | AR[BSPSTORE] |
| RSE.LoadReg | Physical register number that is one greater than the next register to be loaded (modulo N_Stacked_Phy). | RSE.BspLoad |
| RSE.BspLoad | Points to the 64-bit backing store address that is 8 bytes greater than the next address to be loaded by the RSE | |

TABLE 1-continued

| Name | Description | Architectural Location |
| --- | --- | --- |
| RSE.NATBitIndex | 6-bit wide RNAT collection Bit Index — defines which RNAT collection bit gets updated | AR[BSPSTORE] (8:3) |
| RSE.CFLE | Current Frame load enable bit — control bit that permits the RSE to load register in the current frame after a branch return or return from interrupt (rfi) | |

Figure 4:
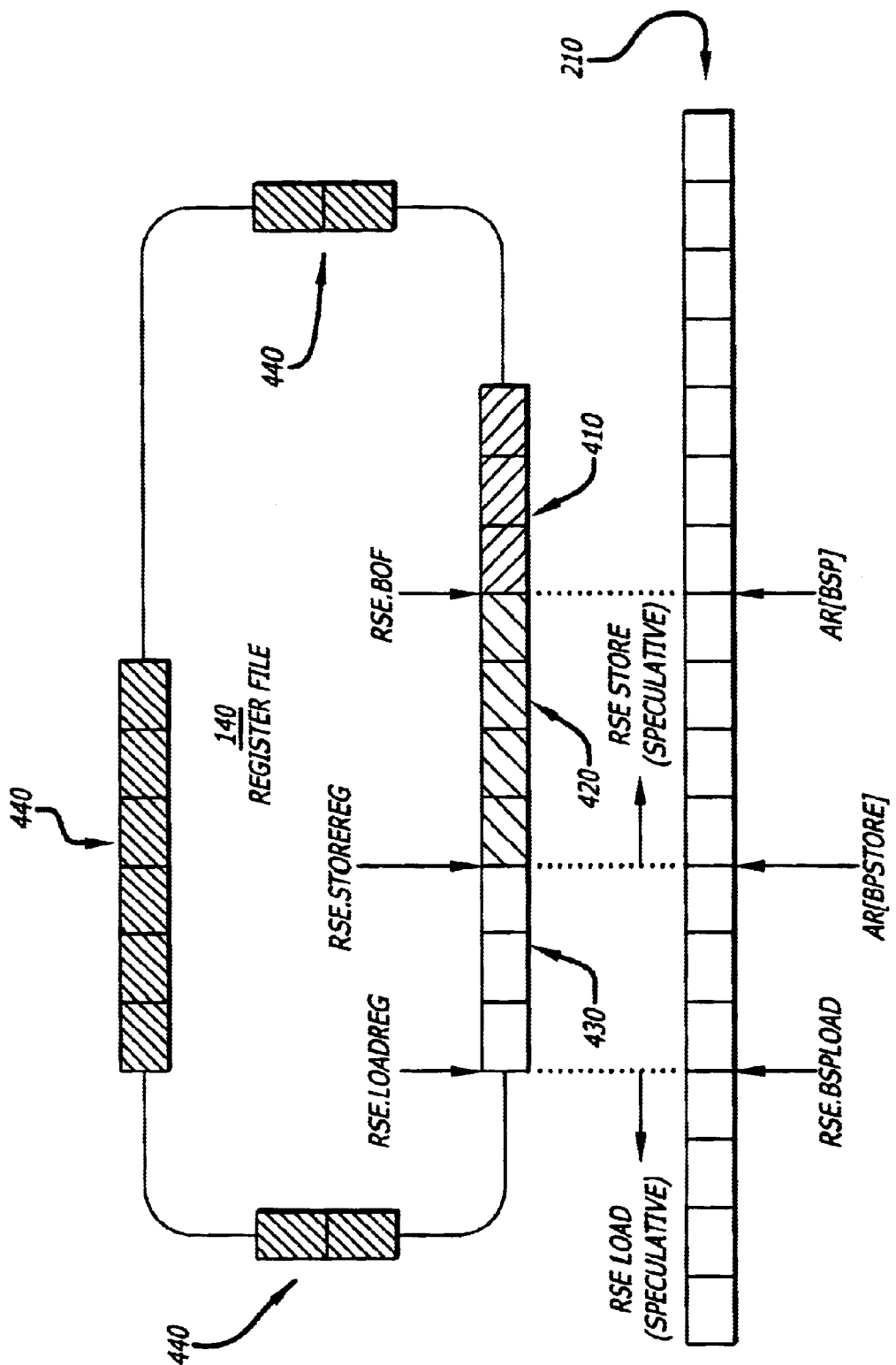
FIG. 4 is a schematic representation of the operations implemented by the register stack engine between the backing memory and the register file of FIG. 1.

FIG. 4 is a schematic representation of the operations implemented by RSE 150 to transfer data speculatively between register file 140 and backing store 210. Various partitions 410, 420, 430 and 440 of register file 140 are indicated along with the operations of RSE 150 on these partitions. For the disclosed embodiment, partition 410 comprises the registers of the current (active) frame, which stores data for ProcC.

Dirty partition 420 comprises registers that store data from a parent procedure which has not yet been copied to backing store 210. For the disclosed embodiment of register management system 200, dirty partition 420 is delineated by the registers indicated through RSE.StoreReg and RSE.BOF. For the example of FIG. 2, dirty partition 420 includes some or all local registers allocated to ProcB and, possibly, ProcA, when the contents of these registers have not yet been copied to backing store 210.

be necessary to transfer data from backing store 210 to register file 140 when a new procedure is (re) activated. The transfer is speculative because another procedure may require allocation of the registers before the procedure associated with the restored data is re-activated.

For one embodiment of the invention, RSE 150 may operate in different modes, depending on the nature of the application that is being executed. In all modes, mandatory spill and fill operations are supported. However, some modes may selectively enable speculative spill operations and speculative fill operations. A mode may be selected depending on the anticipated register needs of the application that is to be executed. For example, a register stack configuration (RSC) register may be used to indicate the mode in which RSE 150 operates. Table 2 identifies four RSE modes, the types of RSE loads and RSE stores enabled for each mode, and a bit pattern associated with the mode.

TABLE 2

| RSE Mode | RSE Loads | RSE Stores | RSC.mode |
| --- | --- | --- | --- |
| Enforced Lazy Mode | Mandatory | Mandatory | 00 |
| Store Intensive Mode | Mandatory | Mandatory + Speculative | 01 |
| Load Intensive Mode | Mandatory + Speculative | Mandatory | 10 |
| Eager Mode | Mandatory + Speculative | Mandatory + Speculative | 11 |

Clean partition 430 includes local registers whose contents have been copied to backing store 210 and have not been modified in the meantime. For the example of FIG. 2, clean partition may include registers allocated to ProcA and, possibly, ProcB. Invalid partition 440 comprises register that do not currently store valid data for any procedures.

RSE 150 monitors processor 110 and executes store operations (RSE_Stores) on registers in dirty partition 420 when bandwidth is available in the memory channel. For the disclosed embodiment of the invention, RSE.StoreReg indicates the next register to be spilled to backing store 210. It is incremented as RSE 150 copies data from register file 140 to backing store 210. RSE_Stores are opportunistic store operations that expand the size of clean partition 430 at the expense of dirty partition 420. RSE_Stores increase the fraction of registers in register file 140 that are backed up in backing store 210. These transfers are speculative because the registers may be reaccessed by the procedure to which they were originally allocated before they are allocated to a new procedure.

Figure 5:
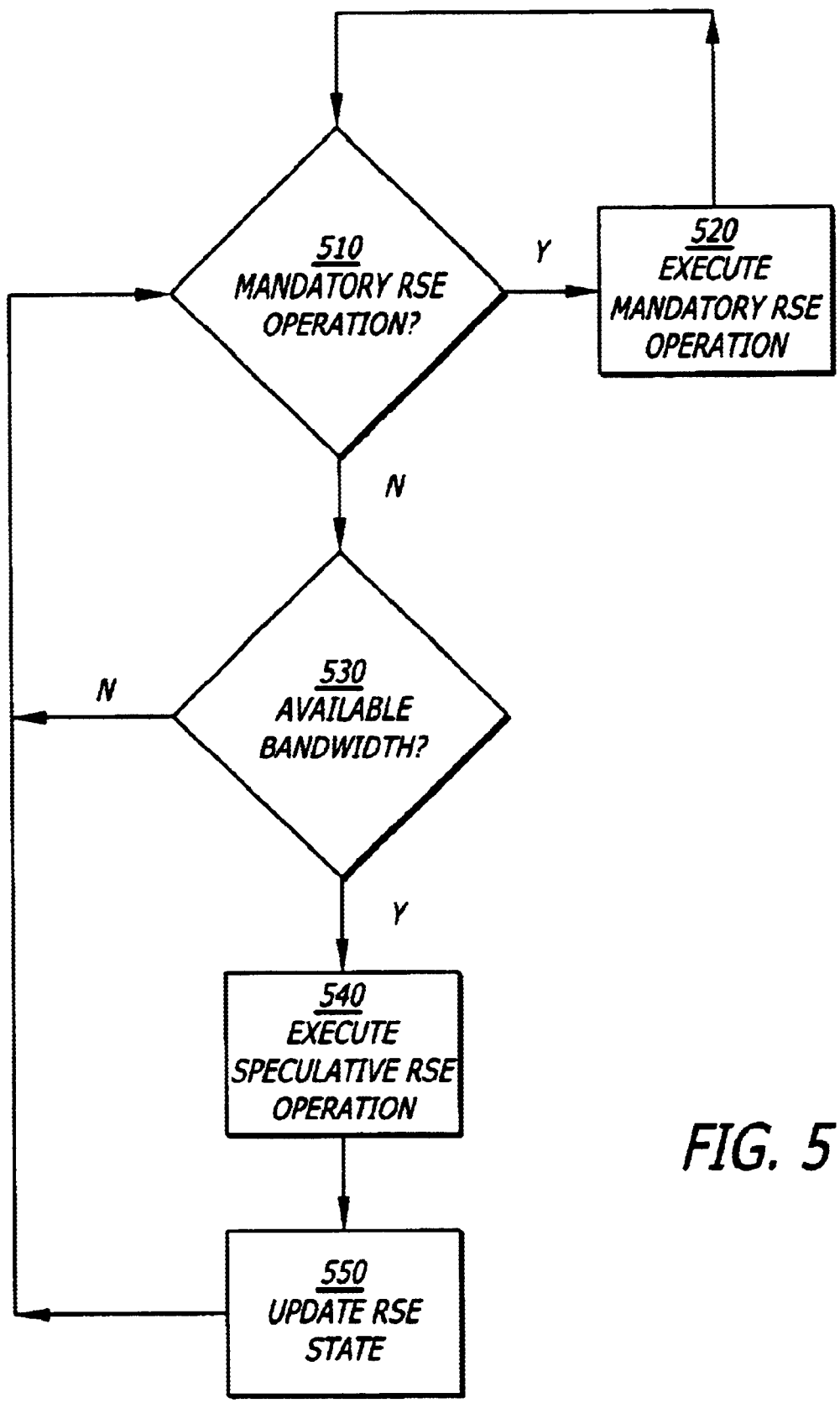
FIG. 5 is a flowchart representing one embodiment of the method in accordance with the present invention for speculatively executing register spill and fill operations.

RSE 150 also executes load operations (RSE_Loads) to registers in invalid partition 440, when bandwidth is available in the memory channel. These opportunistic load operations increase the size of clean partition 430 at the expense of invalid partition 440. For the disclosed embodiment, RSE.LoadReg indicates the next register in invalid partition 440 to which RSE 150 restores data. By speculatively repopulating registers in invalid partition 440 with data, RSE 150 reduces the probability that mandatory loads will FIG. 5 is a flowchart representing one embodiment of a method for managing data transfers between a backing store and a register file. Method 500 checks 510 for mandatory RSE operations. If a mandatory RSE operation is pending, it is executed. If no mandatory RSE operations are pending, method 500 determines 530 whether there is any available bandwidth in the memory channel. If bandwidth is available 530, speculative one or more RSE operations are executed 540 and the RSE internal state is updated 550. If no bandwidth is available 530, method 500 continues monitoring 510, 530 for mandatory RSE operations and available bandwidth.

Figure 6:
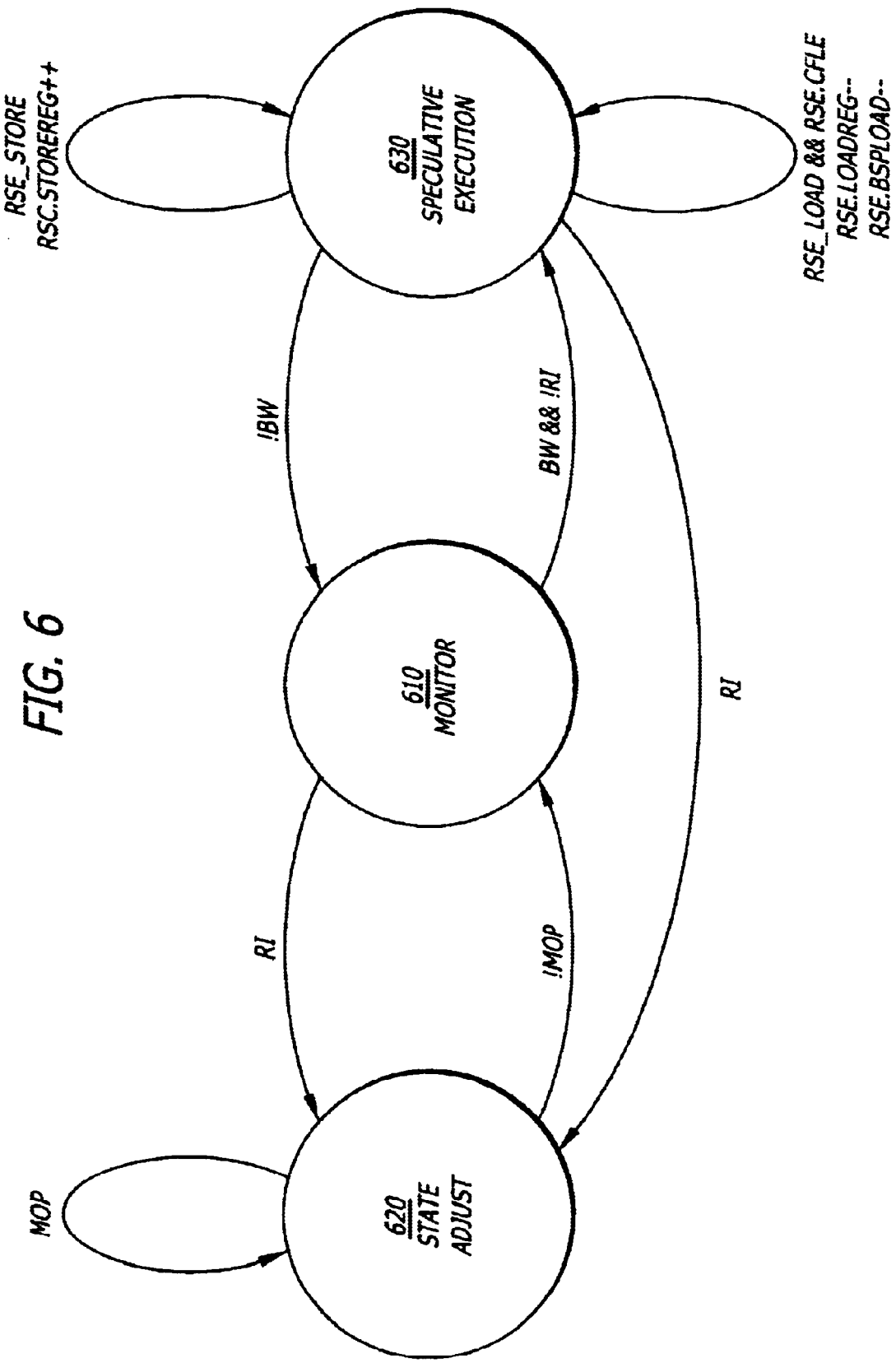
FIG. 6 is a state machine representing one embodiment of the register stack engine in accordance with the present invention.

FIG. 6 represents one embodiment of a state machine 600 that may be implemented by RSE 15. State machine 600 includes a monitor state 610, an adjust state 620 and a speculative execution state 630. For purposes of illustration, it is assumed that speculative RSE_loads and RS_stores are both enabled for state machine 600, i.e. it is operating in eager mode.

In monitor state 610, state machine 600 monitors processor 110 for RSE-related instructions (RI) and available bandwidth (BW). RIs are instructions that may alter portions of the architectural state of the processor that are relevant to the RSE ("RSE state"). The RSE may have to stall the processor and implement mandatory spill and fill operations if these adjustments to indicate that data/registers are not available in the register stack. The disclosed embodiment of state machine 600 transitions to adjust state 620 when an RI is detected and implements changes to the RSE state indicated by the RI. If the RSE state indicates that mandatory spill or fill operations (MOPs) are necessary, these are implemented and the RSE state is adjusted accordingly. If no MOPs are indicated by the state change (!MOP), state machine 600 returns to monitor state 610.

For one embodiment of the invention, RIs include load-register-stack instructions (loadrs), flush-register-stack instructions (flushrs), cover instructions, register allocation instruction (alloc), procedure return instructions (ret) and return-from-interrupt instructions (rfi) instructions. that may alter the architectural state of processor 110 as well as the internal state of the RSE. The effects of various RIs on the processor state for one embodiment of register management system 200 are summarized below in Tables 3 and 4.

If no RIs are detected and bandwidth is available for speculative RSE operations (BW && !RIs), state machine 600 transitions from monitor state 610 to speculative execution state 630. In state 630, state machine 600 may execute RSE_Store instructions for inactive register frames and adjust its register tracking parameter (StoreReg) accordingly, or it may execute RSE_Load instructions on inactive register frames and adjust its memory pointer (BspLoad) and register tracking parameter (LoadReg) accordingly.

State machine 600 transitions from speculative execution state 630 back to monitor state 610 if available bandwidth dries up (!BW). Alternatively, detection of an RI may cause a transition from speculative execution state 630 to adjust state 620.

TABLE 3

| | INSTRUCTIONS | | | |
|---|---|---|---|---|
| AFFECTED STATE | Alloc ($r_1$ = ar.pfs, I, l, o, r) | Branch-Call | Branch-Return | RFI (CR[IFS].v = 1) |
| AR[BSP]{63:3} | Unchanged | AR[BSP]{63:3} + CFM.sol + (AR[BSP]{8:3} + CFM.sol)/63 | AR[BSP]{63:3} − AR[PFS].pfm.sol − (62 − AR[BSP]{8:3} + AR[PFS].pfm.sol)/63 + CFM.sol | AR[BSP]{63:3} CR[IFS].ifm.sof − (62 − AR[BSP]{8:3} + CR[IFS].ifm.sof)/63 |
| AR[PFS] | Unchanged | AR[PFS].pfm = CFM AR[PFS].pec = AR[EC] AR[PFS].ppl = PSR.cpl | Unchanged | Unchanged |
| GR[$r_1$] | AR[PFS] | N/A | N/A | N/A |
| CFM | CFM.sof = i + l + o CFM.sol = i + l CFM.sor = r>>3 | CFM.sof = CFM.sol CFM.sol = 0 CFM.sor = 0 CFM.rrb.gr = 0 CFM.rrb.fr = 0 CFM.rrb.p = 0 | AR[PFS].pfm OR CFM.sof = 0 CFM.sol = 0 CFM.sor = 0 CFM.rrb.gr = 0 CFM.rrb.fr = 0 CFM.rrb.p = 0 | CR[IFS].ifm |

TABLE 4

| | INSTRUCTION | | |
|---|---|---|---|
| AFFECTED STATE | Cover | Flushrs | Loadrs |
| AR[BSP]{63:3} | AR[BSP]{63:3} + CFM.sof + (AR[BSP]{8:3} + CFM.sof)/63 | Unchanged | Unchanged |
| AR[BSPSTORE]{63:3} | Unchanged | AR[BSP]{63:3} | AR[BSP]{63:3} − AR[RSC].loadrs{14:3} |
| RSE.BspLoad{63:3} | Unchanged | Model specific | AR[BSP]{63:3} − AR[RSC].loadrs{14:3} |
| AR[RNAT] | Unchanged | Updated | Undefined |
| RSE.RNATBitIndex | Unchanged | AR[BSPSTORE]{8:3} | AR[BSPSTORE]{8:3} |
| CR[IFS] | If (PSR.ic = 0) {CR[IFS].ifm = CFM CR[IFS].v = 1 | Unchanged | Unchanged |
| CFM | CFM.sof = 0 CFM.sol = 0 CFM.sor = 0 CFM.rrb.gr = 0 CFM.rrb.fr = 0 CFM.rrb.p = 0 | Unchanged | Unchanged |

The present invention thus provides a register management system that supports more efficient use of a processor's registers. A register stack engine employs available bandwidth in the processor-memory channel to speculatively spill and fill registers allocated to inactive procedures. The speculative operations increase the size of the register file's clean partition, reducing the need for mandatory spill and fill operations which may stall processor execution.

The disclosed embodiments of the present invention are provided solely for purposes of illustration. Persons skilled in the art of computer architecture and having the benefit of this disclosure will recognize variations on the disclosed embodiments that fall within the spirit of the present invention. The scope of the present invention should be limited only by the appended claims.

What is claimed is:

1. A computer system comprising:

a memory;

a register file coupled to the memory through a memory channel, the register file to store data for one or more procedures in one or more frames, respectively; and a register stack engine to monitor activity on the memory channel and to transfer data between selected frames of the register file and the memory responsive to available bandwidth on the memory channel, wherein the register stack engine includes a first pointer to indicate a first location in a current frame of the register stack and a second pointer to indicate an oldest dirty register in the register stack.

2. The computer system of claim 1, wherein the register stack engine includes a third pointer to indicate an oldest clean register in the register stack.

3. The computer system of claim 1, wherein the memory includes a backing store, and the register stack engine transfers data between the selected frames and the backing store.

4. The computer system of claim 1, wherein registers of the register file are mapped to the current frame and an inactive frame, and the register stack engine transfers data between the registers mapped to the inactive frame and the backing store.

5. The computer system of claim 1, wherein registers of the register file are mapped to the current frame and an inactive frame, and the registers mapped to the inactive frame are designated as clean or dirty, according to whether or not data stored in the registers has been spilled to the memory.

6. The computer system of claim 5, wherein the register stack engine transfers data from a dirty register to a corresponding location in the backing store when bandwidth is available on the memory channel.

7. The computer system of claim 5, wherein the register stack engine transfers data to a clean register from a corresponding location in the backing store when bandwidth is available on the memory channel.

8. A computer system comprising:

a memory;

a register file coupled to the memory through a memory channel, the register file to store data for one or more procedures in one or more frames, respectively, and wherein registers of the register file are mapped to a current frame and an inactive frame; and a register stack engine to monitor activity on the memory channel and to transfer data between selected frames of the register file and the memory responsive to available bandwidth on the memory channel, the register stack engine to transfer data between registers in the inactive frame and a backing store.

9. The computer system of claim 8, wherein the registers mapped to the inactive frame are designated as clean or dirty, according to whether data stored in the registers has or has not been spilled to the memory.

10. The computer system of claim 9, wherein the memory includes the backing store.

11. The computer system of claim 10, wherein the register stack engine transfers data from a dirty register to a corresponding location in the backing store when bandwidth is available on the memory channel.

12. The computer system of claim 10, wherein the register stack engine transfers data to a clean register from a corresponding location in the backing store when bandwidth is available on the memory channel.

13. A method for managing data in a register stack comprising:

designating registers in the register stack as clean or dirty, according to whether data in the registers has been spilled to a backing store;

monitoring operations on a memory channel;

spilling data from a current oldest dirty register to the backing store when capacity is available on the memory channel;

filling data from the backing store to a current oldest clean register when capacity is available on the memory channel; and updating a pointer to indicate a new oldest clean. register when data is filled to the current oldest clean register.

14. The method of claim 13, further comprising:

updating another pointer to indicate a new oldest dirty register when data is spilled from the current oldest dirty register.

15. A computer system comprising:

a memory system;

a register file to store data for an active procedure and one or more inactive procedures; and a register stack engine to transfer data between registers associated with the one or more inactive procedures and the memory system, responsive to available bandwidth to the memory system, wherein the register stack engine includes a first pointer to track a next inactive register to spill to the memory system and a second pointer to track a next inactive register to fill from the memory system responsive to the available bandwidth to the memory system.

16. The computer system of claim 15, further comprising:

a load/store unit, and wherein the register stack engine monitors the load/store unit to determine the available bandwidth to the memory system.

17. The computer system of claim 15, wherein the register stack engine transfers data for the one or more inactive procedures responsive to a mode status indicator.

18. The computer system of claim 17, wherein the mode status indicator indicates a lazy mode, a store intensive mode, a load intensive mode, or an eager mode, and the register stack engine operates in accordance with the respective mode status indicator.

19. The computer system of claim 18, wherein the mode status indicator is set under software control.

20. A computer system comprising:

a memory system;

a register file to store data for an active procedure and one or more inactive procedures; and a register stack engine to transfer data between registers associated with the one or more inactive procedures and the memory system, responsive to available band width to the memory system, wherein the register stack engine transfers data for inactive procedures responsive to a mode status indicator and operates in a lazy mode, a store intensive mode, a load intensive mode, or an eager mode according to the mode status indicator.

21. The computer system of claim 20, further comprising:

a load/store unit, and wherein the register stack engine monitors the load/store unit to determine the available bandwidth to the memory system.

22. The computer system of claim 20, wherein the mode status indicator is set under software control.

* * * * *